United States Patent [19]

Owen

[11] 3,715,066
[45] Feb. 6, 1973

[54] HANDY TIRE RACK
[76] Inventor: Charles L. Owen, Route No. 4, P.O. Box 1025, Conroe, Tex. 77301
[22] Filed: April 8, 1971
[21] Appl. No.: 132,354

[52] U.S. Cl. ..................................224/42.24
[51] Int. Cl. ..................................B62d 43/00
[58] Field of Search..224/42.24, 42.25, 42.12, 42.32, 224/42.33

[56] References Cited

UNITED STATES PATENTS

| | | | |
|---|---|---|---|
| 2,640,636 | 6/1953 | Dysarz | 224/42.24 |
| 1,505,527 | 8/1924 | Belden et al. | 224/42.24 X |
| 1,965,735 | 7/1934 | Dayes | 224/42.24 |

Primary Examiner—Albert J. Makay
Assistant Examiner—Jerold M. Forsberg

[57] ABSTRACT

A device for supporting a tire and wheel upon a truck, the device composing a vertical bracket forming a stanchion, at the lower end of the bracket being fixedly mounted within a bed of a truck, the bracket having a sidewardly extending cylinder welded thereto with lugs welded there around and against which a wheel may be positioned while a removable bolt is inserted through the cylinder with the bolt head positioned against the outer side of the wheel, the end of the bolt then receiving a securing nut.

3 Claims, 3 Drawing Figures

PATENTED FEB 6 1973 3,715,066

INVENTOR.
CHARLES L. OWEN

HANDY TIRE RACK

This invention relates generally to automotive equipment. More specifically the present invention relates to a spare-tire mount for an automotive truck.

A principal object of the present invention is to provide a handy tire rack that can be mounted upon an automotive truck and where a spare wheel may be conveniently and easily mounted or removed therefrom.

Another object of the present invention is to provide a handy tire rack which can be affixed upon a corner of the truck bed, the rack being readily theft-proof so to prevent the unauthorized removal of the spare wheel and tire.

Still another purpose of the present invention is to provide a handy tire rack which assists in making it easy for the changing of a tire.

Other objects of the present invention are to provide a handy tire rack which is simple in design, inexpensive to manufacture, rugged in construction, easy to use and efficient in operation.

These and other objects will be readily evident upon a study of the following specification and the accompanying drawing wherein.

Figure 1:
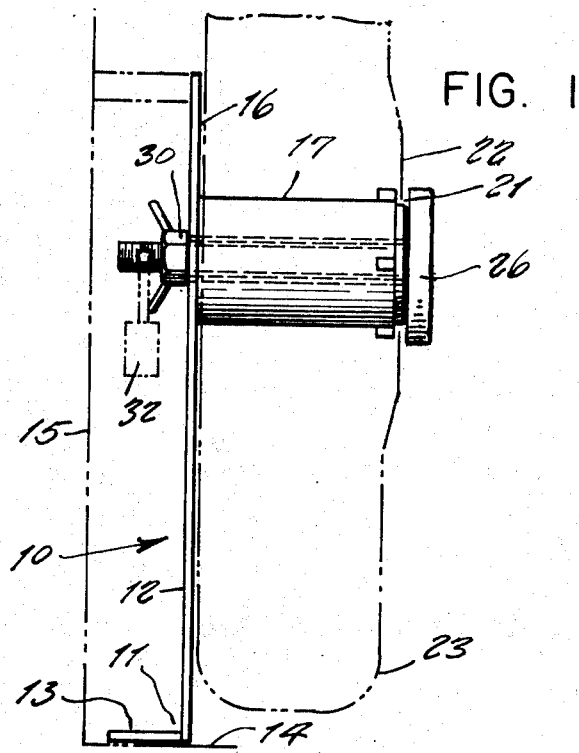
FIG. 1 is a side elevation view of the present invention and showing in phantom lines a spare wheel and tire mounted thereupon.
Figure 2:
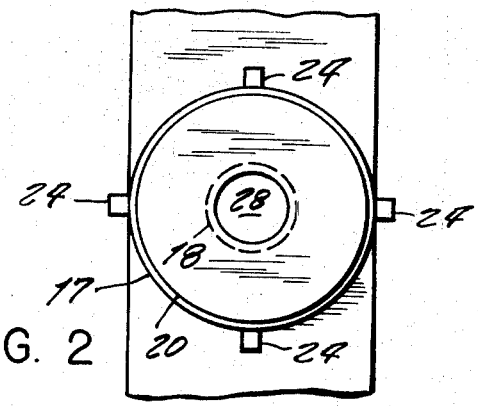
FIG. 2 is a fragmentary enlarged front elevation view thereof.

Referring now to the drawing in detail, the reference numeral 10 represents a handy tire rack according to the present invention wherein there is a vertically upstanding stanchion or bracket that is made of flat metal plate of rectangular configuration and which is provided with a right angle bend 11 transversely there across so as to form a relatively tall upright leg 12 and a relatively short horizontal leg 13 which can be readily fixedly attached to a bed 14 of an automotive truck 15.

Near an upper end of the leg 12 there is welded to one side 16 of the vertical leg 12 a cylindrically configurated sleeve 17 which is located concentrically about a pipe 18 fitted through a central opening 19 in the vertical leg 12 of the bracket and likewise rigidly welded thereto.

The pipe 18 is of one inch internal diameter whereas the cylindrical sleeve 17 is of three and one half inch outer diameter, the sleeve having a side wall of one quarter inch.

Figure 3:
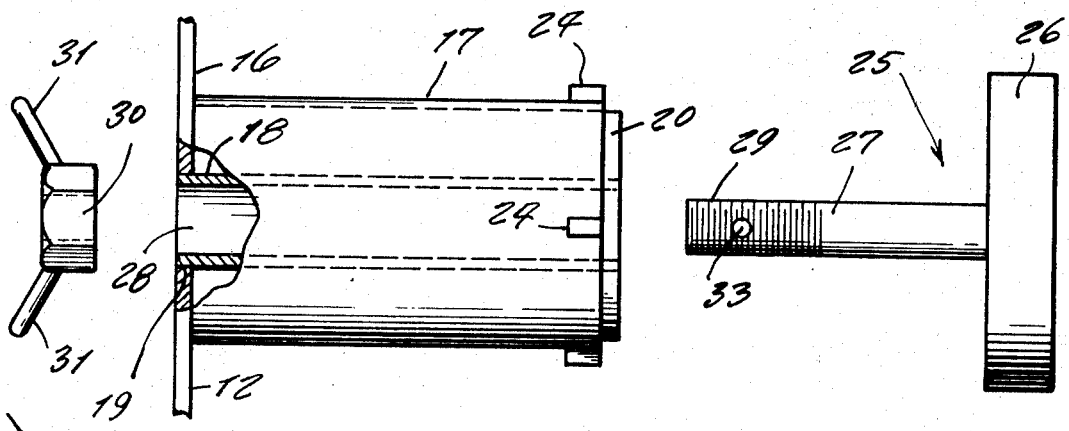
FIG. 3 is an exploded side elevation view of the components and shown partly in cross section.

The pipe and sleeve are each of approximately six inches in length. The opposite end of the pipe 18 is welded to a face plate 20 fitted into the opposite end of the sleeve 17 and from which it protrudes forwardly approximately one quarter inch such as is evident in FIG. 3 of the drawing and which is readily receivable within a central opening 21 of a spare wheel 22 that carries a spare tire 23.

A plurality of lugs 24 are mounted upon the cylindrical side of the sleeve 17, the lugs 24 being positioned so that they bear against the inner side of the wheel 22.

A bolt 25 is provided with an enlarged head 26 for being positioned adjacent the outer side of the wheel 22 as shown in FIG. 1, when the shank 27 of the bolt is inserted through the sleeve opening 28 so that the threaded portion 29 of the bolt is engageable with a nut 30 on the rear side of the bracket.

The nut may be provided with a pair of diagonally radially outwardly extending bars 31 for the purpose of providing leverage for a person when attempting to remove the nut without the benefit of any wrench being applied directly to the hexagonal exterior of the nut 30.

After the nut is fully secured upon the threaded end of the bolt, a padlock 32 may be secured through an opening 33 extending transversely through the shank of the bolt so to prevent any unauthorized person from removing the bolt and thus stealing the wheel and tire.

In use the spare tire is mounted to the handy tire rack by engaging the wheel with the face plate 20 which has been machined to fit snugly within the wheels central opening 21. The wheel, when engaged, abuts the lugs 24 on its inner surface and is retained in the engaged position by the head 26 of bolt 25. The bolt 25 is inserted through the central opening 21 the sleeve opening 28 and is fastened in position by nut 30.

Thus there is provided a tire rack that can be conveniently bolted upon any part of an automotive truck and from which a spare wheel and tire can be quickly and easily removed for a tire change, the device including means to prevent unauthorized removal of the wheel and tire.

What I now claim is:

1. In a handy tire rack, the combination of a stanchion comprising a bracket, said bracket supporting a cylindrically configurated sleeve over which a spare wheel and tire may be removably positioned, and a removable bolt and nut for permitting removal of said wheel and tire from said sleeve, wherein said bracket is comprised of a rectangular steel plate which is provided with a transverse extending bend there across so to form a horizontal leg and a vertical leg, said vertical leg being relatively long while said horizontal leg is relatively short, said horizontal leg being adaptable to be fixedly attached upon a supporting surface of a truck bed or the like, an upper portion of said vertical leg having an opening there through, one end of a pipe being fitted into said opening and welded therein, a cylindrical sleeve being fitted concentrically around said pipe and being welded at one end to a side of said vertical leg of said bracket, the opposite end of said pipe being welded to a face plate fitted into an end of said sleeve and from which it protrudes outwardly a short distance for being fitted into a central opening of said spare wheel.

2. The combination as set forth in claim 1, wherein a plurality of lugs are welded in spaced apart relation around the outer side of said cylindrical sleeve, said lugs being positioned adjacent said end from which said face olate protrudes so that said lugs are positioned adjacent an inner side of said automotive wheel.

3. The combination as set forth in claim 2, wherein a removable bolt is insertable through said pipe, one end of said bolt having an enlarged head for being positioned adjacent the front side of said wheel, a shank of said bolt being externally threaded and provided with a transverse opening therethrough, said threaded shank being threadingly engageable with a nut, and said transverse opening being adaptable for receiving a padlock.

* * * * *